(12) United States Patent
Abd Elhamid et al.

(10) Patent No.: US 11,498,839 B2
(45) Date of Patent: Nov. 15, 2022

(54) SYSTEMS AND METHODS FOR PRODUCING HIGH-PURITY FINE POWDERS

(71) Applicant: GM GLOBAL TECHNOLOGY OPERATIONS LLC, Detroit, MI (US)

(72) Inventors: Mahmoud Abd Elhamid, Troy, MI (US); Andrew C. Bobel, Troy, MI (US); Anil K. Sachdev, Rochester Hills, MI (US); Mark W. Verbrugge, Troy, MI (US); Nicholas P. Pieczonka, Windsor (CA); James R. Salvador, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 704 days.

(21) Appl. No.: 16/428,993

(22) Filed: Jun. 1, 2019

(65) Prior Publication Data
US 2020/0377370 A1 Dec. 3, 2020
US 2021/0316996 A9 Oct. 14, 2021

(51) Int. Cl.
*C01B 33/021* (2006.01)
*C01B 33/037* (2006.01)
(52) U.S. Cl.
CPC .......... *C01B 33/021* (2013.01); *C01B 33/037* (2013.01); *C01P 2004/03* (2013.01); *C01P 2004/61* (2013.01); *C01P 2004/62* (2013.01); *C01P 2006/40* (2013.01)
(58) Field of Classification Search
CPC ............................ C01B 33/021; C01B 33/039
See application file for complete search history.

(56) References Cited

U.S. PATENT DOCUMENTS 4,195,067 A * 3/1980 Kotval ............... H01L 31/1804
423/348

FOREIGN PATENT DOCUMENTS

CN 109371305 A * 2/2019 .............. B22F 3/115

* cited by examiner

*Primary Examiner* — Khanh T Nguyen
(74) *Attorney, Agent, or Firm* — Quinn IP Law (57) ABSTRACT

Systems, methods and compositions to produce fine powders are described. These include forming a hypereutectic melt including a target material, a sacrificial-matrix material, and an impurity, rapidly cooling the hypereutectic melt to form a hypereutectic alloy having a first phase and a second phase, annealing the hypereutectic alloy to alter a morphology of the target material to thereby produce target particles, and removing the sacrificial matrix to thereby produce a fine powder of the target particles. The first phase is defined by the target material and the second phase is defined by the sacrificial-matrix material. The sacrificial-matrix material forms a sacrificial matrix having the target material dispersed therethrough.

20 Claims, 9 Drawing Sheets

SYSTEMS AND METHODS FOR PRODUCING HIGH-PURITY FINE POWDERS

INTRODUCTION

The disclosure relates to the field of metallurgy and, more specifically, to systems and methods for producing high-purity fine powders, such as substantially pure silicon, from metallurgical-grade powders.

Advanced technologies, such as high energy-density batteries and electronics, employ fine powders of high-purity materials, such as silicon. However, production of such high-purity fine powders generally requires complex, energy-intensive processes. For example, purification of silicon may require formation of nanosized particles and chemical treatments, or may involve chemical conversion, distillation, and deposition. Such processes are overly burdensome, particularly when nanosized particles are not desired.

SUMMARY

It is desirable to form high-purity fine powders without employing high-energy and/or low-efficiency processes. Beneficially, processes described herein may be used to produce high-purity fine powders from low-cost raw materials, such as lower-grade materials or recycled alloys. For example, battery-grade silicon may be produced quickly and efficiently from metallurgical-grade silicon while avoiding complex and energy-intensive processing. Beneficially, fine powders of the purified target material may be produced with both a desired average particle size and a narrow particle-size distribution, and also with cleaner and smoother surfaces than alternative processes.

According to aspects of the present disclosure, a method includes forming a hypereutectic melt including a target material, a sacrificial-matrix material, and an impurity, rapidly cooling the hypereutectic melt to form a hypereutectic alloy, annealing the hypereutectic alloy to thereby produce an annealed hypereutectic alloy, and removing the sacrificial matrix to thereby produce a fine powder of the target particles. The hypereutectic alloy has a first phase and a second phase. The first phase is defined by the target material and the second phase is defined by the sacrificial-matrix material. The sacrificial-matrix material forms a sacrificial matrix having the target material dispersed therethrough. The annealing is configured to alter a morphology of the target material to thereby produce target particles from the target material such that the target particles have an average particle size of less than 20 μm.

According to further aspects of the present disclosure, the target material is silicon and the sacrificial-matrix material is aluminum, magnesium, copper, iron, or zinc.

According to further aspects of the present disclosure, the hypereutectic alloy includes silicon from between about 25 to about 80 atomic percent on a basis of all atoms in the hypereutectic alloy, aluminum from between about 10 to about 75 atomic percent on a basis of all atoms in the hypereutectic alloy, and impurities in an amount less than about 10 atomic percent on a basis of all atoms in the hypereutectic alloy.

According to further aspects of the present disclosure, rapidly cooling the hypereutectic melt occurs at a rate between about $10^3$ K/sec and about $10^{10}$ K/sec.

According to further aspects of the present disclosure, annealing the hypereutectic alloy is conducted at a temperature between about 150° C. and about 550° C. for a time between about 0.1 hours and about 100 hours.

According to further aspects of the present disclosure, annealing the hypereutectic alloy is conducted at a temperature between about 425° C. and about 500° C. for a time between about 3 hours and about 6 hours.

According to further aspects of the present disclosure, removing the sacrificial matrix includes applying a strong acid to the annealed hypereutectic alloy.

According to further aspects of the present disclosure, removing the sacrificial matrix includes applying hydrochloric acid, a mixture of phosphoric and hydrochloric acid, or a mixture of nitric and hydrochloric acid to the annealed hypereutectic alloy.

According to further aspects of the present disclosure, removing the sacrificial matrix includes applying a strong base to the annealed hypereutectic alloy.

According to further aspects of the present disclosure, removing the sacrificial matrix includes applying sodium hydroxide or potassium hydroxide to the annealed hypereutectic alloy.

According to further aspects of the present disclosure, removing the sacrificial matrix includes forming an electrochemical cell having an anode formed from the hypereutectic alloy, and extracting electrical energy from the electrochemical cell to thereby liberate the target particles from the sacrificial matrix.

According to further aspects of the present disclosure, further comprising removing non-target particles from the fine powder using physical techniques for mineral separation.

According to further aspects of the present disclosure, the non-target particles are removed from the fine powder via density sorting processes.

According to further aspects of the present disclosure, the non-target particles are removed from the fine powder via magnetic removal processes.

According to further aspects of the present disclosure, the hypereutectic melt further includes an additive configured to be absorbed by the target particles.

According to further aspects of the present disclosure, the additive is configured to modify electrical properties of the target particles from properties of the target material.

According to further aspects of the present disclosure, the additive is copper.

According to further aspects of the present disclosure, removal of the sacrificial matrix includes exposure of the hypereutectic alloy to a non-aqueous solvent to thereby remove the sacrificial matrix.

According to further aspects of the present disclosure, the target particles are pure silicon.

According to further aspects of the present disclosure, the hypereutectic alloy includes silicon in an amount from between about 25 and about 80 atomic percent on a basis of all atoms in the hypereutectic alloy, aluminum in an amount between about 10 and about 75 atomic percent on a basis of all atoms in the hypereutectic alloy, and impurities in an amount less than about 10 atomic percent on a basis of all atoms in the hypereutectic alloy, wherein the target particles are pure silicon, wherein removing the sacrificial matrix includes forming an electrochemical cell having an anode formed from the hypereutectic alloy, and extracting electrical energy from the electrochemical cell to thereby liberate the target particles from the sacrificial matrix, and wherein sodium hydroxide or potassium hydroxide is applied to the annealed hypereutectic alloy.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

The drawings are illustrative and not intended to limit the subject matter defined by the claims. Exemplary aspects are discussed in the following detailed description and shown in the accompanying drawings in which:

DETAILED DESCRIPTION

High-purity fine powders, as well as systems and processes for producing the same, are disclosed herein. Beneficially, processes described herein may produce high-purity fine powders from low-cost raw materials, such as lower-grade materials or recycled alloys. For example, battery-grade silicon may be produced quickly and efficiently from metallurgical-grade silicon. As disclosed herein, systems and processes purify metallurgical grade materials to produce higher-grade materials while reducing complex, expensive, and energy-intensive processing. Beneficially, fine powders of the purified target material may be produced with both a desired average particle size and a narrow particle-size distribution. Further, the fine powders of the purified target material possess cleaner and smoother surfaces than alternative processes. Yet further, as disclosed herein, low cost, low energy processes may be used to recycle many process components and electrical energy, which further reduces the overall cost to produce the fine powders disclosed herein.

Figure 1:
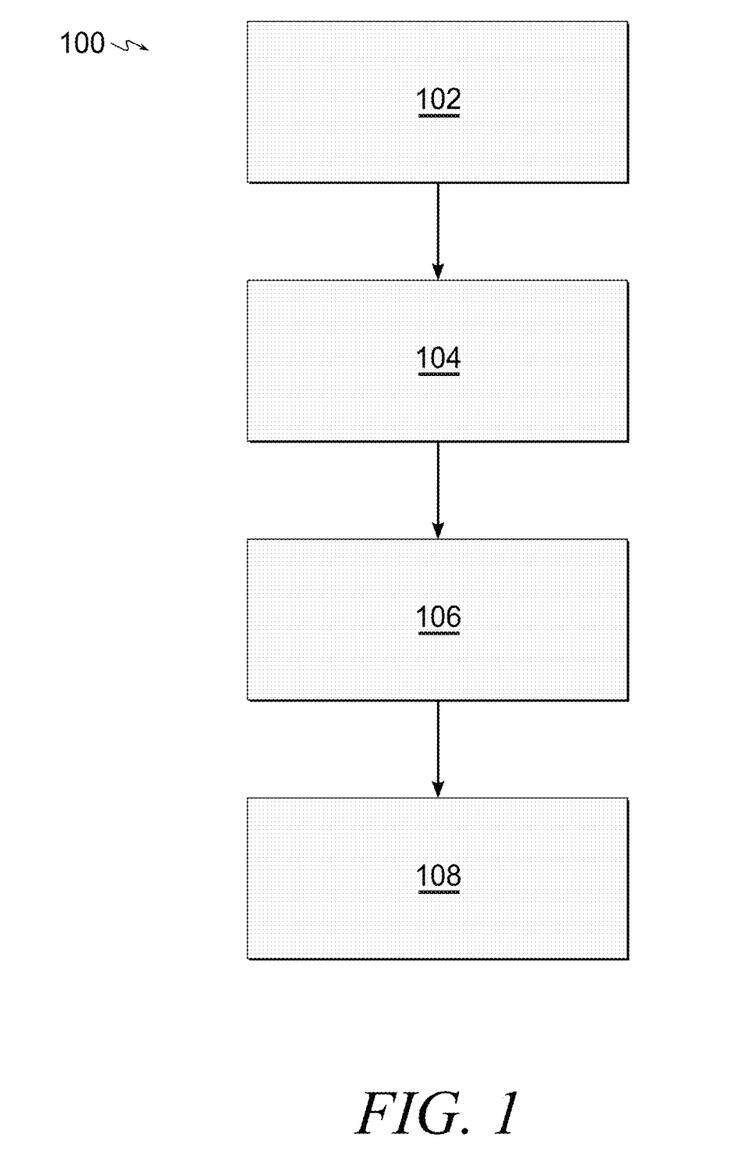
FIG. 1 illustrates an example method of forming a fine powder, according to aspects of the present disclosure.

FIG. 1 illustrates an example method 100 of forming a fine powder. The method 100 includes forming 102 a hypereutectic melt, rapidly cooling 104 the hypereutectic melt to form a hypereutectic alloy, annealing 106 the hypereutectic alloy to produce desired physical characteristics of the target material and the resulting fine powder, and removing 108 the sacrificial matrix to produce a fine powder of the target material. The hypereutectic alloy (e.g., FIGS. 4 and 5) has a first phase defined by the target material and a second phase defined by a sacrificial matrix such that the first phase (e.g., target material) is dispersed throughout the second phase (e.g., sacrificial matrix).

The hypereutectic melt includes the target material, the sacrificial-matrix material, and impurities. The hypereutectic melt is formed from raw materials such as metallurgical-grade target material and sacrificial matrix material. Additionally, or alternatively, the raw material may include alloys containing the target material, such as recycled hypereutectic alloys. In some aspects, the raw material either is or includes an alloy containing the target material, the sacrificial matrix material, and the impurities where the target material does not define a desired particle size for the fine powder.

The sacrificial-matrix material is selected to optimize several criteria based on the target material and impurities to be extracted. The sacrificial-matrix material has low solubility for the target material. As used herein, the term "low solubility" is used to indicate that target material particles of a desired size are able to be directly precipitated from the hypereutectic melt to form a first phase that is distinguishable and distributed throughout the sacrificial-matrix material while minimizing intermetallics or atomic distribution of the target material through the sacrificial-matrix material. Further, the sacrificial-matrix material has a greater affinity for the impurities than the affinity of the target material.

Additionally, the sacrificial-matrix material is selected such that any phases formed during solidification or heat treatment have a negligible affinity for the target material. As used herein, "negligible affinity" means that such phases will not solvate the first phase during processing. In some aspects, such phases solvate less than 10% of the first phase. In some further aspects, such phases solvate less than 1% of the first phase. In some yet further aspects, such phases solvate less than 0.1% of the first phase.

Notably, formation of intermetallics including the target material, the sacrificial-matrix material, and one or more of the impurities is acceptable. In some aspects, the intermetallics may be easily separable from the fine powder of the target material, and/or the intermetallics may concentrate the impurities in relatively fewer particles such that the target performance of the pure target material particles within the fine powder is not appreciably inhibited by the presence of the few intermetallic particles.

Beneficially, the sacrificial-matrix material may also be selected such that digested forms are readily recyclable to the base metal of the sacrificial-matrix material. For example, the sacrificial-matrix material is selected such that the chloride or hydroxide form of the sacrificial-matrix material may be reduced and recycled to the sacrificial-matrix material base metal using low-energy processes.

Figure 2:
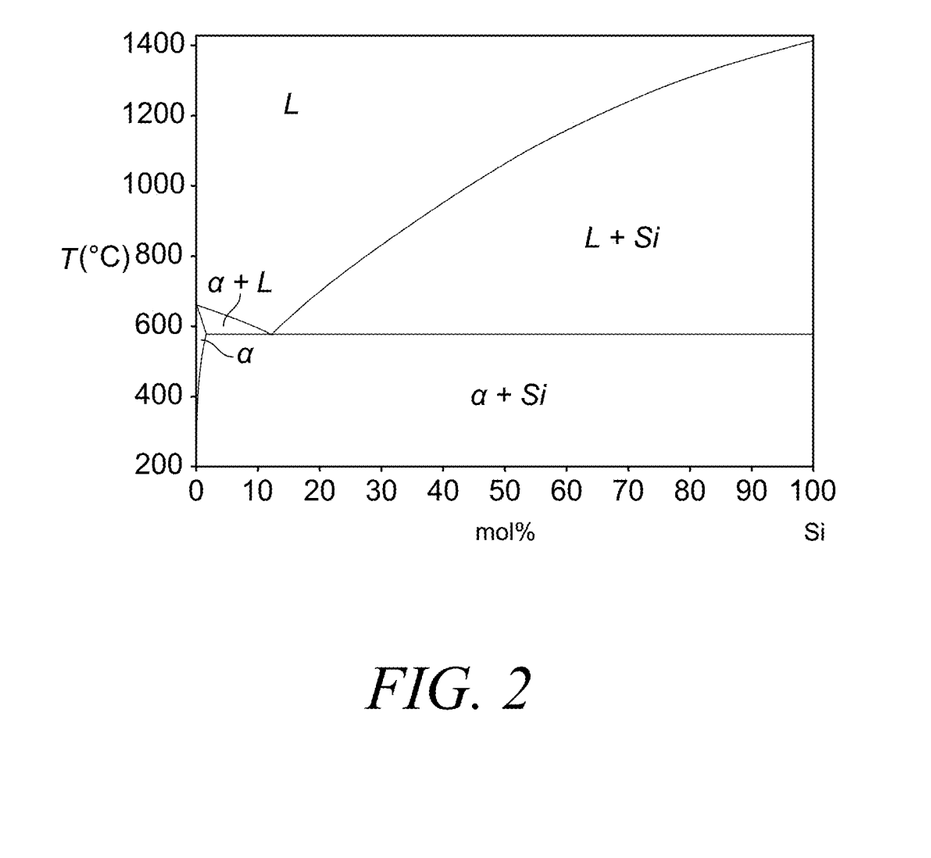
FIG. 2 illustrates an example phase diagram for a mixture of aluminum and silicon.

In some aspects, the target material is silicon, the sacrificial-matrix material is aluminum, and the impurities include one or more of iron, copper, zinc, and magnesium. FIG. 2 illustrates an example phase diagram for a mixture of aluminum and silicon. As can be seen, the example mixture of aluminum and silicon have a eutectic point at approximately 12.6% silicon and a eutectic line at approximately 577° C. As can be seen, aluminum is not soluble within silicon, so there is no appreciable β phase.

The hypereutectic melt may further include one or more additives. The additives may be configured to for example, alloy with the target material, alloy with the sacrificial matrix material, inhibit formation of particular intermetallics, promote formation of intermetallics which are readily separable from the target material, promote solvation of the impurities within the sacrificial-matrix material, solvate the impurities, etc. For example, in some aspects, the target material is silicon and the hypereutectic melt further includes an additive of copper. Silicon has a higher affinity for copper than does aluminum. The copper additive is generally solvated by the silicon particles without substantially contaminating the aluminum matrix. Beneficially, the copper additive may be used to enhance and tune electrical conductivity of the silicon particles.

After forming the hypereutectic melt, a hypereutectic alloy is formed by rapidly cooling the hypereutectic alloy. Beneficially, rapidly cooling the hypereutectic melt as described herein forms a hypereutectic alloy having a first phase defined by the target material and a second phase defined by the sacrificial matrix having the target material dispersed therethrough. In some aspects, the hypereutectic alloy includes silicon from between about 25 to about 80 atomic percent on a basis of all atoms in the hypereutectic alloy, aluminum from between about 10 to about 75 atomic percent on a basis of all atoms in the hypereutectic alloy, and impurities in an amount less than about 10 atomic percent on a basis of all atoms in the hypereutectic alloy. Further, in some aspects, the hypereutectic alloy includes silicon from between about 40 to about 75 atomic percent on a basis of all atoms in the hypereutectic alloy, aluminum from between about 20 to about 60 atomic percent on a basis of all atoms in the hypereutectic alloy, and impurities in an amount less than about 5 atomic percent on a basis of all atoms in the hypereutectic alloy. In further aspects, the hypereutectic alloy includes silicon from between about 60 to about 70 atomic percent on a basis of all atoms in the hypereutectic alloy, aluminum from between about 28 to about 40 atomic percent on a basis of all atoms in the hypereutectic alloy, and impurities in an amount less than about 2 atomic percent on a basis of all atoms in the hypereutectic alloy.

Figure 3:
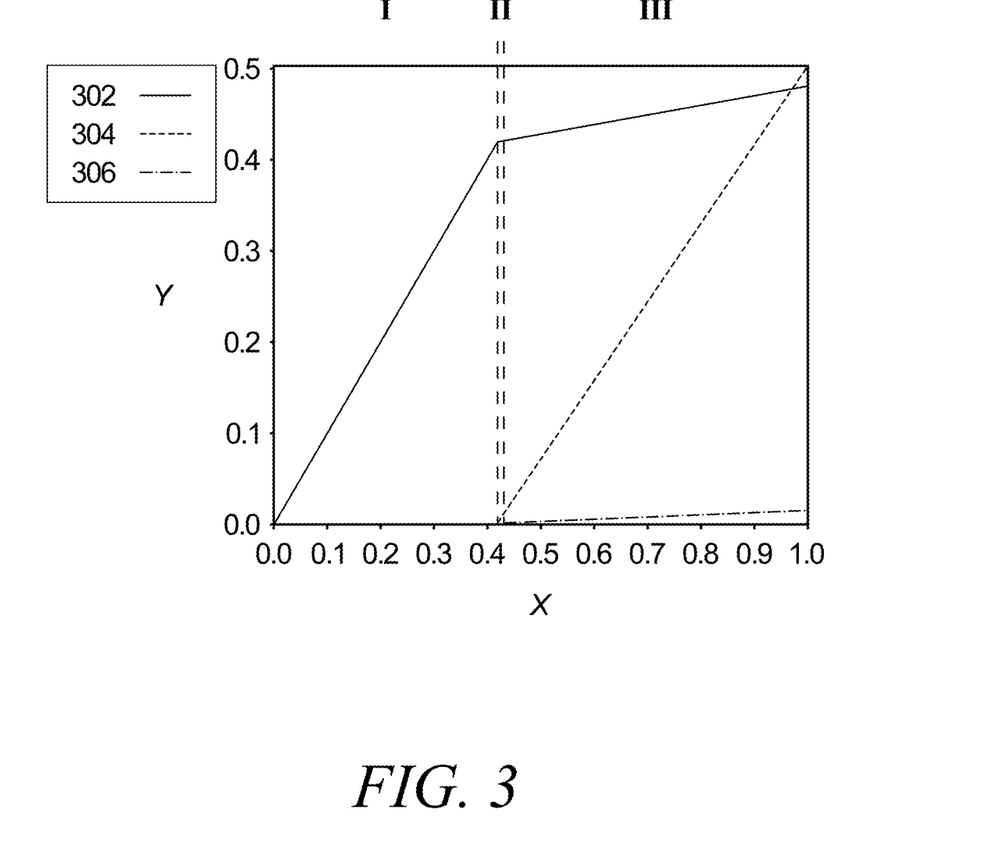
FIG. 3 illustrates an example diagram of phases formed by rapidly cooling a hypereutectic melt of silicon and aluminum with an iron impurity, according to aspects of the present disclosure.

FIG. 3 illustrates an example diagram of phases formed during formation of a hypereutectic alloy by rapidly cooling a hypereutectic melt of silicon and aluminum with an iron impurity. The X axis is the mol fraction of solids in the melt (e.g., how much of the melt has solidified), where 0.0 is an entirely liquid and 1.0 is entirely solid. The Y axis is the mol fraction of each solid phases within the mixture. Line 302 corresponds to the pure silicon phase, which has a diamond (A4) crystal structure. Line 304 corresponds to the sacrificial matrix which is substantially aluminum, which has a face-centered cubic ($L1_2$) crystal structure. Line 306 corresponds to forming intermetallics of aluminum, silicon, and iron, such as $Al_9Fe_2Si_2$ crystals. In the example diagram, the formation occurs in three general regimes. In the first regime I, crystals of pure silicon begin forming. The iron impurity, which has a higher melting point than silicon, remains solvated by the liquid aluminum in the melt. In the second regime II, the sacrificial matrix begins forming, and forms at a rate greater than the concurrent rate of formation of the silicon phase. In the third regime III, the intermetallic begins forming. Beneficially, the rate of formation for the intermetallic is lower than the concurrent rates for either the pure silicon phase or the sacrificial matrix phase. The composition of the resulting hypereutectic alloy, on the basis of volume, is about 49% substantially pure silicon particles, about 45% aluminum sacrificial matrix, and about 1.3% $Al_9Fe_2Si_2$ particles.

As used herein, the "rapidly cooling" means cooling at a rate sufficient to produce the desired hypereutectic alloy that includes a first phase of the target material particles distributed through the second phase of the sacrificial matrix. Beneficially, the conditions for rapidly cooling are selected to provide the target material particles with initial characteristics such as an initial particle size and an initial particle-size distribution. Beneficially, the initial particle size may be selected to provide a floor to the particle size of the resulting fine powder. Further, the initial particle-size distribution may be selected to provide an outer limit to the width of the particle-size distribution of the resulting fine powder. As used herein, the terms "particle size" and "particle-size distribution" may be measured using methods based on design requirements and standards of the use-case for the resulting fine powder. In some aspects, the particle size is measured using digital imaging and/or statistical analysis.

The hypereutectic melt may be rapidly cooled using processes such as melt spinning, atomization of melt to powder, splat quenching, etc. In some aspects, the hypereutectic melt is cooled between about $10^1$ K/sec and about $10^{12}$ K/sec. In some aspects, the hypereutectic melt is cooled between about $10^2$ K/sec and about $10^{11}$ K/sec. In some aspects, the hypereutectic melt is cooled between about $10^3$ K/sec and about $10^{10}$ K/sec. Beneficially, cooling of a hypereutectic melt of aluminum and silicon (with or without impurities) cooled at a rate between about $10^3$ K/sec and about $10^{10}$ K/sec provides particles of amorphous silicon with an initial particle size and particle-size distribution that carries an amount of generally amorphous silicon which, after crystallization via annealing, produces a fine powder with a final particle size of less than 10 µm. Beneficially, the quench rate may also be selected to provide a desired ribbon thickness to optimize downstream processes, such as annealing and digestion. For example, ribbon thickness can be optimized by being thick enough to provide the desired mechanical properties while being thin enough to provide a generally uniform temperature profile during annealing.

After formation, the hypereutectic alloy is annealed to produce desired physical characteristics of the target material particles and resulting fine powder. The desired physical characteristics may include, for example, a target particle morphology, target particle size, and target particle-size distribution. During the annealing, the initial morphology of the target material particles is altered to provide the desired morphology for the fine powder. For example, the annealing is configured to convert the target material from generally amorphous to either generally or substantially crystalline. Further, the annealing is configured to alter shape of the target particles from, for example, generally prismatic or flake-shaped to generally rounder or spheroidal particles. Beneficially, the annealing is further configured to narrow the particle-size distribution from the initial particle-size distribution, as well as more finely control the average particle size from that available during the rapid solidification. For example, after annealing, the target particles may have an average particle size of less than 20 µm. Beneficially, in some aspects, the target particles have an average particle size of less than 10 µm after annealing. For example, equiaxed target particles may be produced with an average particle size from about 3 µm to about 5 µm, Further, the target particles as disclosed herein may include particle sizes from between about 0.01 µm to about 100 µm. Beneficially, the annealing also provides for enhanced or more-complete removal of the sacrificial matrix material from the resulting fine powder. The hypereutectic alloy is annealed using a temperature from about 150° C. to about 550° C. for a time between about 0.1 hours to about 100 hours. In some aspects, the hypereutectic alloy is annealed using a temperature from about 425° C. to about 500° C. for a time between about 3 hours and about 6 hours.

Figure 4:
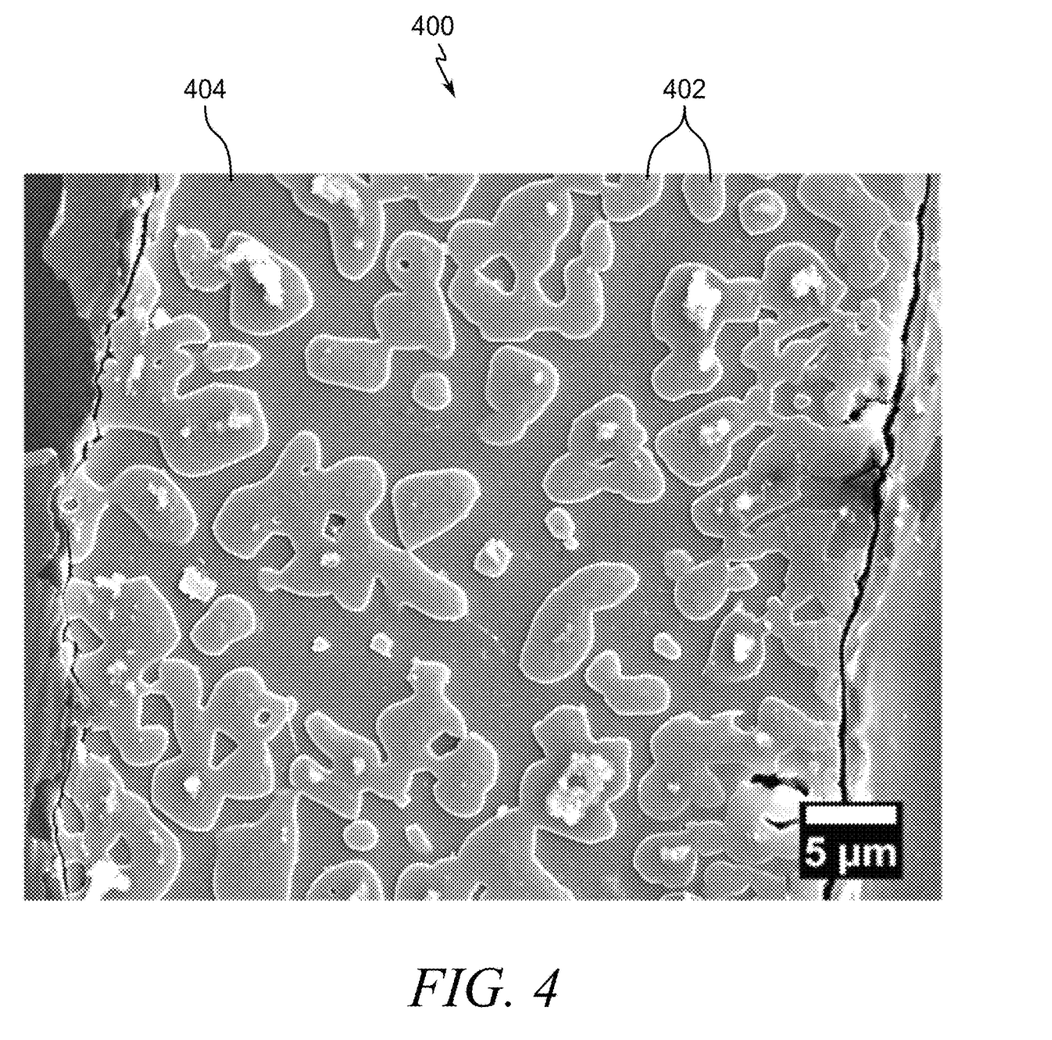
FIG. 4 illustrates an image of an example hypereutectic alloy formed according to aspects of the present disclosure.

FIG. 4 illustrates an image of an example hypereutectic alloy 400 formed according to aspects of the present disclosure. The illustrated hypereutectic alloy 400 is Al-50Si, which was annealed at 500° C. for 4 hours. As can be seen, the silicon particles 402 are generally rounded and are distributed throughout the aluminum matrix 404.

Figure 5:
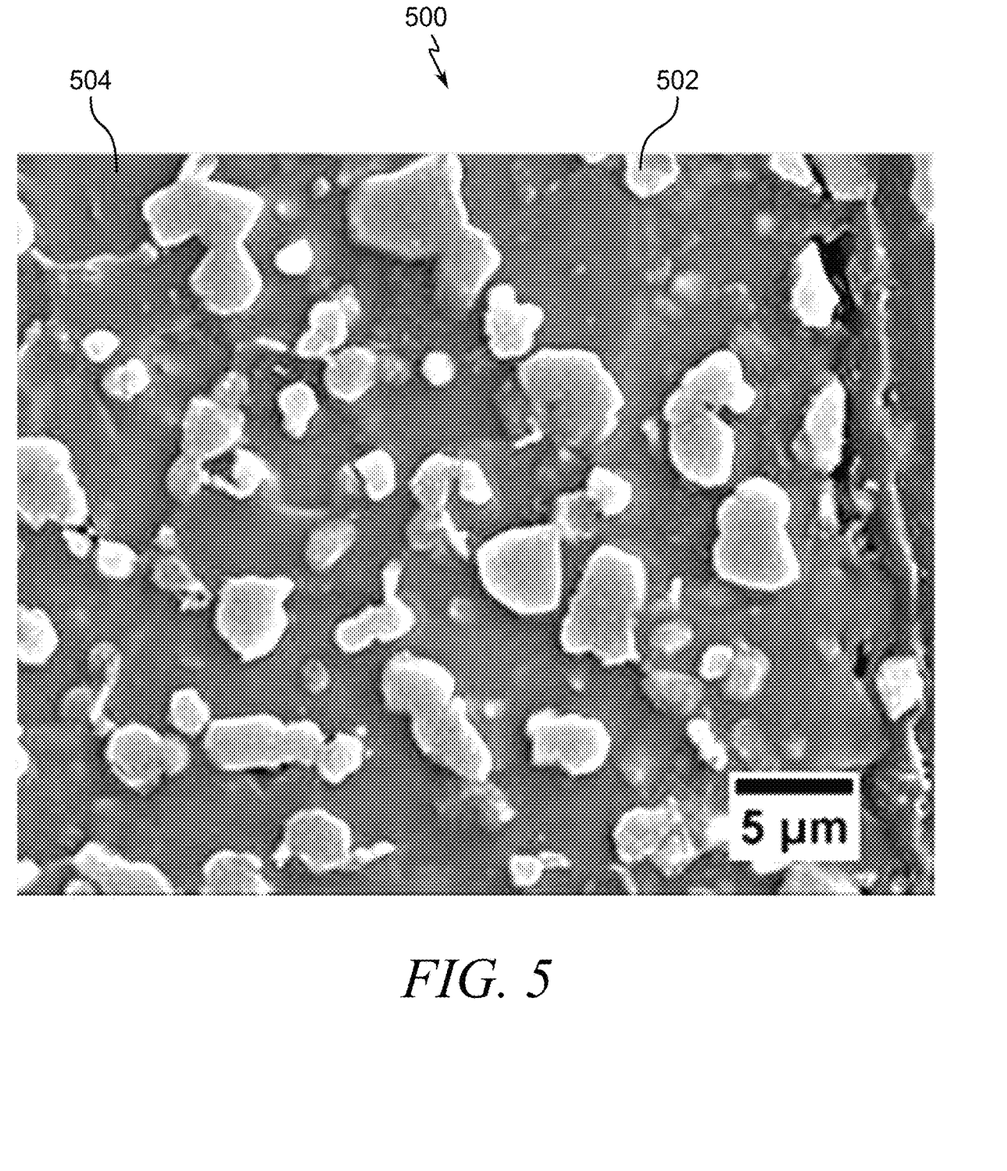
FIG. 5 illustrates an image of another example hypereutectic alloy formed according to aspects of the present disclosure.

FIG. 5 illustrates an image of an example hypereutectic alloy 500 formed according to aspects of the present disclosure. The illustrated hypereutectic alloy 500 is Al-20Si-3.5Cu, which was annealed at 500° C. for 4 hours. As recognized by one of ordinary skill in the art, the copper is substantially associated with the silicon particles. The copper-doped silicon particles 502 are generally rounded and are distributed throughout the aluminum matrix 504.

Figure 6:
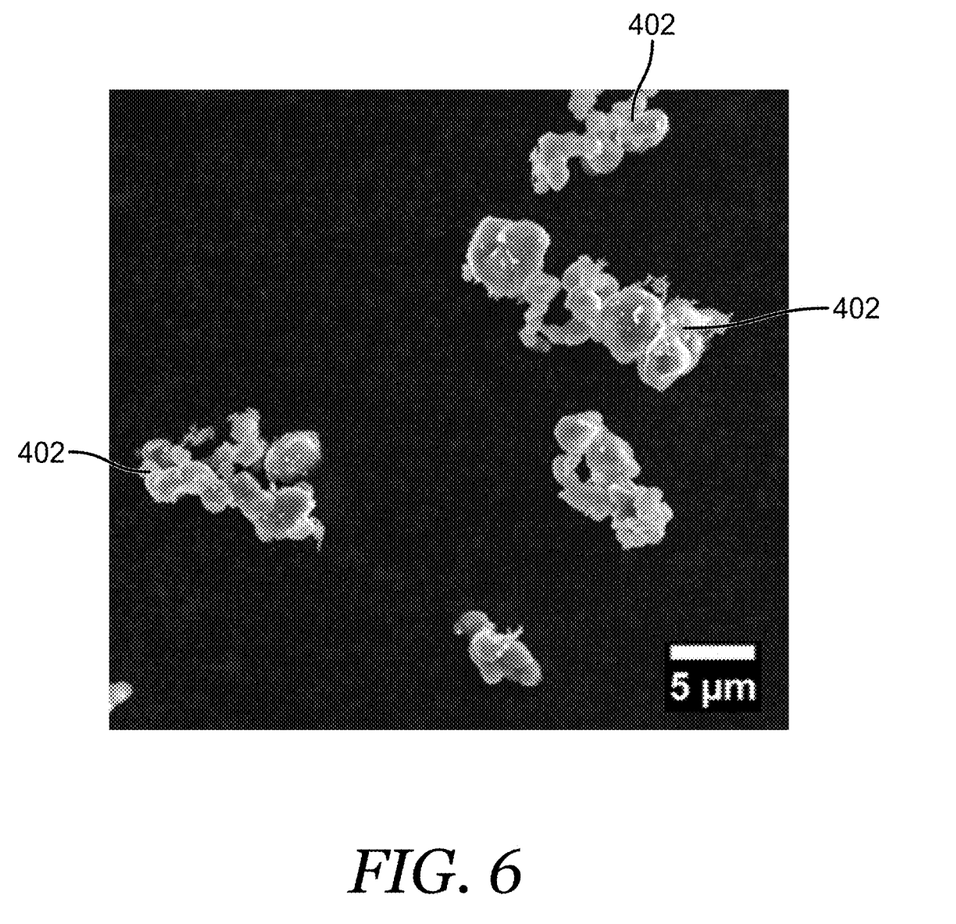
FIG. 6 illustrates an image of an example fine powder produced from removal of the sacrificial matrix from the annealed hypereutectic alloy of FIG. 4.

The annealed hypereutectic alloy is then subjected to a treatment to free the target particles from the sacrificial matrix to produce a fine powder including the target particles. FIG. 6 illustrates an image of an example fine powder 600 produced from removal of the sacrificial matrix 504 from the annealed hypereutectic alloy 500. The equiaxed silicon particles 502 have an average particle size of 3 μm, and a particle-size distribution between 1 μm and 7 μm.

In some aspects, the annealed hypereutectic alloy is treated with etchants to selectively remove the sacrificial matrix. The etchants are configured to react with the sacrificial matrix to solvate the sacrificial-matrix material without significantly reacting with the target particles. For example, the annealed hypereutectic alloy 300 may be subjected to treatment with an acid etchant or a base etchant. In some aspects, the acid etchant is a strong acid, such as hydrochloric acid, a mixture of phosphoric and hydrochloric acid, a mixture of nitric and hydrochloric acid, and the like. In some aspects, the base etchant is a strong base, such as sodium hydroxide or potassium hydroxide. Beneficially, the etchants may be contained within a non-aqueous solvent having a relatively high dielectric constant, such as acetonitrile or propylene carbonate. As used herein, "high dielectric constant" is used to indicate that the dielectric constant of the solution is high enough to substantially inhibit oxidation of the target material. In some aspects, the sacrificial-matrix material is magnesium, and the etchant is an electrolyte such as saltwater.

Figure 7:
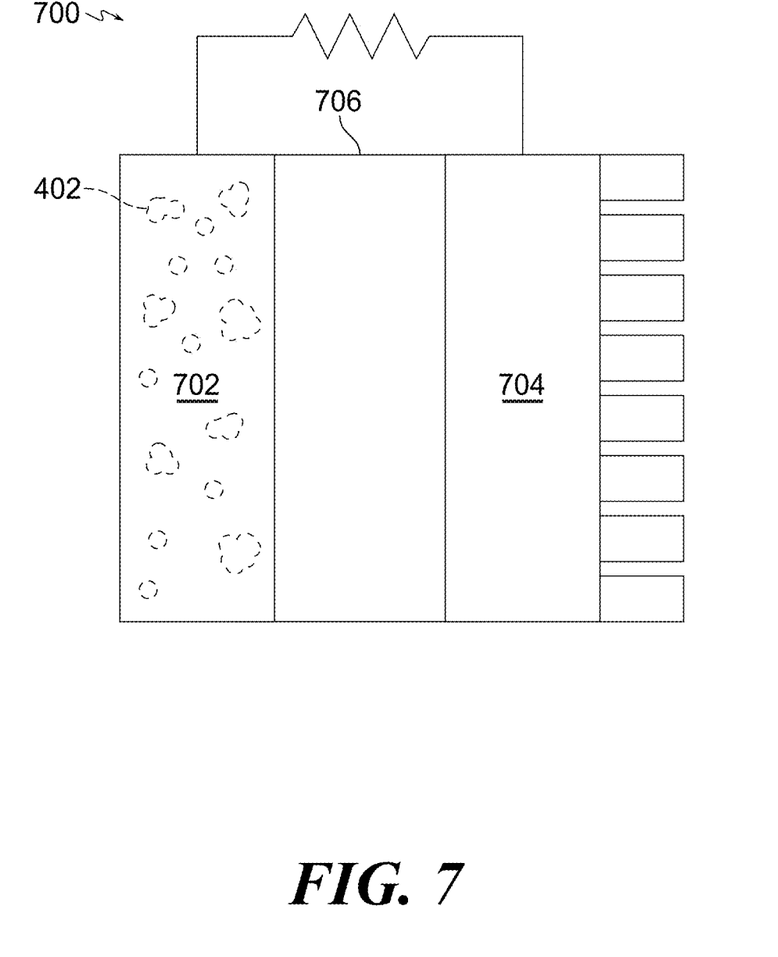
FIG. 7 illustrates an example electrochemical cell.

In some aspects, the annealed hypereutectic alloy is subjected to an electrochemical process that removes the sacrificial matrix. FIG. 7 illustrates an example electrochemical cell 700. The electrochemical cell 700 is a primary battery in the form of an aluminum-air battery. The electrochemical cell 700 includes an anode 702 and cathode 704 with an electrolyte 706 therebetween. The annealed hypereutectic alloy 400 forms the anode 702. As energy is extracted from the electrochemical cell 700, the aluminum matrix 404 is oxidized and the silicon particles 402 are liberated therefrom. After liberation, the silicon particles 402 may be collected from the electrolyte 706 concurrently with or after discharging of the electrochemical cell 700. After consumption, the anode 702 may be mechanically refreshed through placement of another annealed hypereutectic alloy 400. Beneficially, energy extracted from the electrochemical cell 700 may be used to form additional electrochemical cells 700, recycle aluminum ions to the base metal, etc.

Non-target particles, such as intermetallics formed during the cooling process, may be consumed during treatment of annealed hypereutectic alloy, or may remain after removal of the sacrificial matrix from the annealed hypereutectic alloy. In some aspects, the fine powder is commercially marketable without removal of the non-target particles because concentration of the impurity within a limited number of particles allows for use of the fine powder without significantly negatively affecting the desired characteristics of the fine powder. For example, without removal of the $Al_9Fe_2Si_2$, the fine powder produced from the example of FIG. 3 includes 97.4% pure silicon particles by volume with only 2.6% of particles by volume being non-target. Beneficially, such concentration within fewer particles—as opposed to being than being present within substantially all particles of the fine powder—may allow the bulk material to have desired mechanical and or electrical properties that are substantially similar to pure silicon powder without further separation of the contaminating material.

In some aspects, the non-target particles remaining after liberating the target particles from the sacrificial matrix are removed to produce a substantially pure fine powder of equiaxed target particles. Removal of the non-target particles may employ chemical and/or physical techniques for mineral separation. For example, ferrous particles, such as the intermetallic of $Al_9Fe_2Si_2$, may be removed from non-magnetic particles, such as silicon, using magnetic sorting. Additionally, or alternatively, methods of sorting particles by density may be used to separate the target particles from non-target particles. Yet further, chemical treatment that selectively attacks the non-target particles may be used to remove non-target particles or enhance separation of the non-target particles with later-applied separation techniques.

As would be readily recognized by one of ordinary skill in the art, the term "hypereutectic" as used herein is used with respect to the target material. For example, when the target material is silicon, a "hypereutectic" melt or alloy of aluminum and silicon will be greater than about 12.6 mol % silicon.

Words of approximation, such as "approximately," "about," "substantially," and the like, may be used herein in the sense of "at, near, or nearly at," "within 0-10% of," or "within acceptable manufacturing tolerances," or a logical combination thereof, for example.

All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. The numerical parameters set forth herein and in the attached claims are approximations that may vary depending upon the desired properties sought to be obtained by the present disclosure. At the very least, and not as an attempt to limit the application of the doctrine of equivalents to the scope of the claims, each numerical parameter should at least be construed in view of the number of reported significant digits and by applying ordinary rounding techniques.

While the metes and bounds of the term "about" are readily understood by one of ordinary skill in the art, the term "about" indicates that the stated numerical value or property allows imprecision. If the imprecision provided by "about" is not otherwise understood in the art with this ordinary meaning, then "about" indicates at least variations that may arise from ordinary methods of measuring and using such parameters. For example, if not otherwise understood in the art, the term "about" means within 10% (e.g., ±10%) of the stated value.

While the metes and bounds of the term "substantially" are readily understood by one of ordinary skill in the art, the term "substantially" indicates that the stated numerical value or property allows some imprecision. If the imprecision provided by "substantially" is not otherwise understood in the art with this ordinary meaning, then "substantially" indicates at least variations that may arise from manufacturing processes and measurement of such parameters. For example, if not otherwise understood in the art, the term "substantially" means within 5% (e.g., ±5%) of the stated value.

While the metes and bounds of the term "essentially" are readily understood by one of ordinary skill in the art, the term "essentially" indicates that the stated numerical value or property allows some slight imprecision. If the imprecision provided by "essentially" is not otherwise understood in the art with this ordinary meaning, then "essentially" indicates at least negligible variations in desired parameters that may be impracticable to overcome. For example, if not otherwise understood in the art, the term "essentially" means within 1% (e.g., ±1%) of the stated value.

While the metes and bounds of the term "pure" are readily understood by one of ordinary skill in the art, the term "pure" indicates that the compound may include very slight traces of other materials. If the imprecision provided by "pure" is not otherwise understood in the art with this ordinary meaning, then "pure" indicates at least variations that may arise from separation processes and measurement of such parameters. For example, if not otherwise understood in the art, the term "pure" means above 99.5% of the stated material.

It is to be understood that the ranges provided herein include the stated range and a value or sub-range within the stated range.

Comparative Example 1

A hypereutectic melt is formed including aluminum in an amount of 82 atomic percent on a basis of all atoms in the hypereutectic melt, silicon in an amount of 17.5 atomic percent on a basis of all atoms in the hypereutectic melt, and copper in an amount of 0.5 atomic percent on a basis of all atoms in the hypereutectic melt. The hypereutectic melt is rapidly cooled to form ribbons of a hypereutectic alloy having the same atomic percentages.

Figure 8:
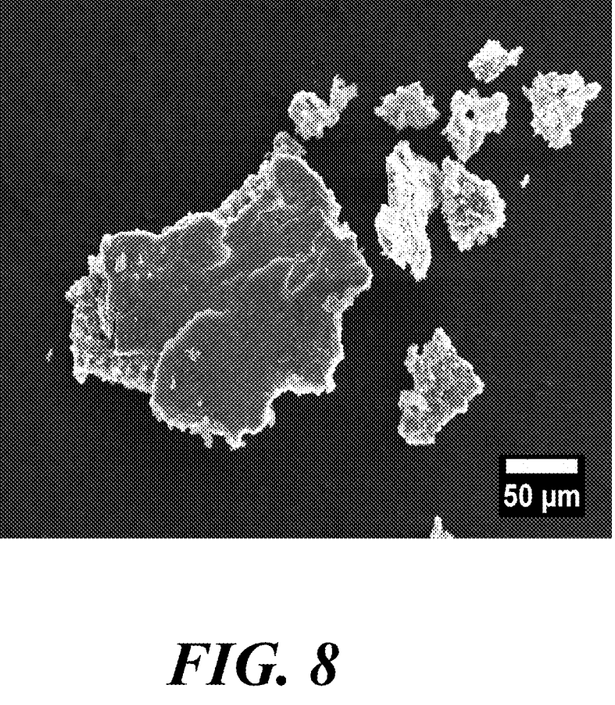
FIG. 8 illustrates an example image of the digestion product of the as-spun ribbons of the hypereutectic alloy.

The as-spun ribbons of the hypereutectic alloy are digested using hydrochloric acid. After treatment with hydrochloric acid, the resultant powder 6.2 atomic percent on a basis of all atoms in the powder, silicon in an amount of 90 atomic percent on a basis of all atoms in the powder, and copper in an amount of 0.8 atomic percent on a basis of all atoms in the powder. The powder is analyzed using digital imaging and Raman spectroscopy to determine that particles within the resulting powder are generally flake-like and include a large amount of amorphous silicon. FIG. 8 illustrates an example image of the digestion product of the as-spun ribbons of the hypereutectic alloy.

Example 2

A hypereutectic melt is formed including aluminum in an amount of 77.0 atomic percent on a basis of all atoms in the hypereutectic melt, silicon in an amount of 22.0 atomic percent on a basis of all atoms in the hypereutectic melt, and copper in an amount of 1.0 atomic percent on a basis of all atoms in the hypereutectic melt. The hypereutectic melt is rapidly cooled to form ribbons of a hypereutectic alloy having the same atomic percentages.

Figure 9:
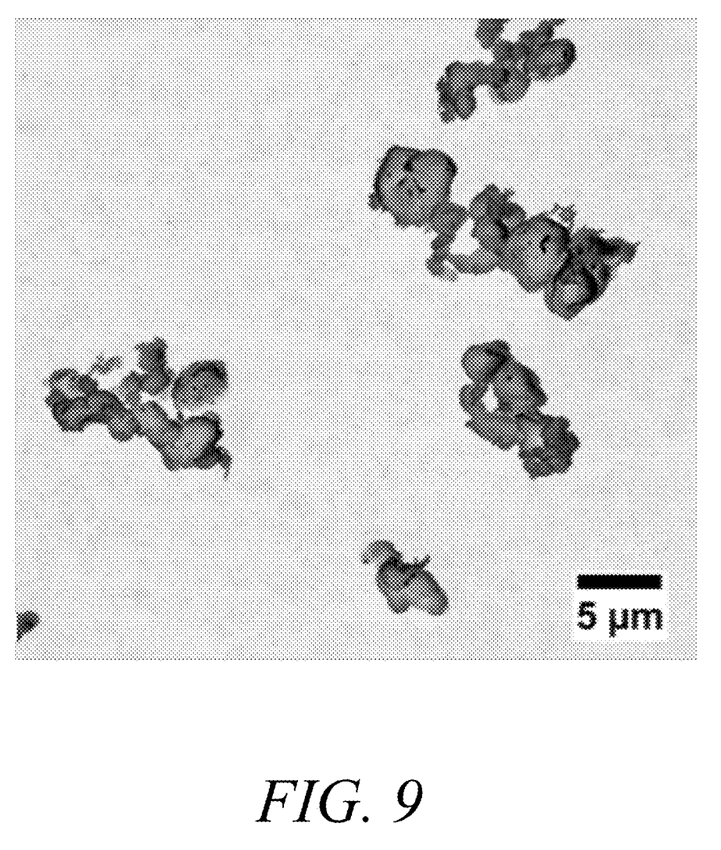
FIG. 9 illustrates an example SEM image of the digestion product of the annealed hypereutectic alloy.

The ribbons of the hypereutectic alloy are subjected to a heat treatment at 500° C. for 4 hours to produce an annealed hypereutectic alloy. The annealed hypereutectic alloy is digested using hydrochloric acid. After treatment with hydrochloric acid, the resultant powder includes aluminum in an amount of 0.30 atomic percent on a basis of all atoms in the powder, silicon in an amount of 95.70 atomic percent on a basis of all atoms in the powder, and copper in an amount of 4.00 atomic percent on a basis of all atoms in the powder. The powder is analyzed using SEM imaging and Raman spectroscopy to determine that particles within the resulting powder are generally rounded and include a large amount of crystalline silicon. FIG. 9 illustrates an example SEM image of the digestion product of the annealed hypereutectic alloy.

While the best modes for carrying out the disclosure have been described in detail, those familiar with the art to which this disclosure relates will recognize various alternative designs and embodiments for practicing the disclosure within the scope of the appended claims.

What is claimed is:
1. A method comprising:
    forming a hypereutectic melt including a target material, a sacrificial-matrix material, and an impurity;
    rapidly cooling the hypereutectic melt to form a hypereutectic alloy and intermetallics including the target material, the sacrificial-matrix material, and the impurity, the hypereutectic alloy having a first phase and a second phase, wherein the first phase is defined by the target material and the second phase is defined by the sacrificial-matrix material, the sacrificial-matrix material forming a sacrificial matrix having the target material dispersed therethrough;
    annealing the hypereutectic alloy to thereby produce an annealed hypereutectic alloy, the annealing configured to alter a morphology of the target material to thereby produce target particles from the target material such that the target particles have an average particle size of less than 20 μm; and
    removing the sacrificial matrix to thereby produce a fine powder of the target particles and the intermetallics.
2. The method of claim 1, wherein the target material is silicon and the sacrificial-matrix material is aluminum.
3. The method of claim 2, wherein the hypereutectic alloy includes:
    silicon from between about 25 to about 80 atomic percent on a basis of all atoms in the hypereutectic alloy;
    aluminum from between about 10 to about 75 atomic percent on a basis of all atoms in the hypereutectic alloy; and
    impurities in an amount less than about 10 atomic percent on a basis of all atoms in the hypereutectic alloy.
4. The method of claim 1, wherein rapidly cooling the hypereutectic melt occurs at a rate between about $10^3$ K/sec and about $10^{10}$ K/sec.
5. The method of claim 1, wherein annealing the hypereutectic alloy is conducted at a temperature between about 150° C. and about 550° C. for a time between about 0.1 hours and about 100 hours.
6. The method of claim 1, wherein annealing the hypereutectic alloy is conducted at a temperature between about 425° C. and about 500° C. for a time between about 3 hours and about 6 hours.
7. The method of claim 1, wherein removing the sacrificial matrix includes applying a strong acid to the annealed hypereutectic alloy.
8. The method of claim 1, wherein removing the sacrificial matrix includes applying hydrochloric acid, a mixture of phosphoric and hydrochloric acid, or a mixture of nitric and hydrochloric acid to the annealed hypereutectic alloy.
9. The method of claim 1, wherein removing the sacrificial matrix includes applying a strong base to the annealed hypereutectic alloy.

10. The method of claim 1, wherein removing the sacrificial matrix includes applying sodium hydroxide or potassium hydroxide to the annealed hypereutectic alloy.

11. The method of claim 1, wherein removing the sacrificial matrix includes:
   forming an electrochemical cell having an anode formed from the hypereutectic alloy; and
   extracting electrical energy from the electrochemical cell to thereby liberate the target particles from the sacrificial matrix.

12. The method of claim 1, wherein the target particles have average particle between 3 μm and 5 μm, and wherein the target particles are larger than 0.01 μm and smaller than 100 μm.

13. The method of claim 12, wherein the intermetallics are removed from the fine powder via density sorting processes.

14. The method of claim 12, wherein the intermetallics are removed from the fine powder via magnetic removal processes.

15. The method of claim 1, wherein the hypereutectic melt further includes an additive configured to be absorbed by the target particles.

16. The method of claim 15, wherein the additive is configured to modify electrical properties of the target particles from properties of the target material.

17. The method of claim 15, wherein the additive is copper.

18. The method of claim 1, wherein removal of the sacrificial matrix includes exposure of the hypereutectic alloy to a non-aqueous solvent to thereby remove the sacrificial matrix.

19. The method of claim 1, wherein the target particles are pure silicon.

20. The method of claim 1, wherein the hypereutectic alloy includes silicon in an amount from between about 25 and about 80 atomic percent on a basis of all atoms in the hypereutectic alloy, aluminum in an amount between about 10 and about 75 atomic percent on a basis of all atoms in the hypereutectic alloy, and impurities in an amount less than about 10 atomic percent on a basis of all atoms in the hypereutectic alloy, wherein the target particles are pure silicon, wherein removing the sacrificial matrix includes forming an electrochemical cell having an anode formed from the hypereutectic alloy, and extracting electrical energy from the electrochemical cell to thereby liberate the target particles from the sacrificial matrix, and wherein sodium hydroxide or potassium hydroxide is applied to the annealed hypereutectic alloy.

* * * * *